(12) United States Patent
Farkas et al.

(10) Patent No.: US 9,178,656 B2
(45) Date of Patent: Nov. 3, 2015

(54) METHODS AND APPARATUS FOR EXTRACTING SYMBOLS FROM AN SC-FDMA DIGITAL COMMUNICATIONS SIGNAL USING A MAXIMUM LIKELIHOOD DETECTOR

(71) Applicant: Collision Communications, Inc., Peterborough, NH (US)

(72) Inventors: Joseph Farkas, Merrimack, NH (US); Brandon Hombs, Merrimack, NH (US); Sayak Bose, Milford, NH (US)

(73) Assignee: Collision Communications, Inc., Peterborough, NH (US)

( * ) Notice: Subject to any disclaimer, the term of this patent is extended or adjusted under 35 U.S.C. 154(b) by 0 days.

(21) Appl. No.: 14/138,210

(22) Filed: Dec. 23, 2013

(65) Prior Publication Data

US 2015/0180611 A1    Jun. 25, 2015

(51) Int. Cl.
*H04L 25/03* (2006.01)
*H04L 1/00* (2006.01)
*H04L 27/26* (2006.01)
*H04L 25/02* (2006.01)
*H04B 7/04* (2006.01)

(52) U.S. Cl.
CPC ............ *H04L 1/0054* (2013.01); *H04B 7/0413* (2013.01); *H04L 1/0052* (2013.01); *H04L 25/024* (2013.01); *H04L 25/03305* (2013.01); *H04L 27/2636* (2013.01); *H04L 25/03203* (2013.01); *H04L 2025/03414* (2013.01); *H04L 2025/03598* (2013.01)

(58) Field of Classification Search
CPC ............ H04L 1/0054; H04L 25/03305; H04L 27/2636; H04L 25/024; H04L 1/0052; H04B 7/0413
USPC .................. 375/262, 341, 267, 347
See application file for complete search history.

(56) References Cited

U.S. PATENT DOCUMENTS

| 7,526,037 | B2 * | 4/2009 | Hoo ............................. | 375/267 |
|---|---|---|---|---|
| 8,385,446 | B2 * | 2/2013 | Lee et al. .................... | 375/262 |
| 8,542,781 | B2 * | 9/2013 | Wang et al. ................. | 375/340 |
| 2012/0033683 | A1 * | 2/2012 | Sahlin et al. ............... | 370/480 |
| 2015/0078490 | A1 * | 3/2015 | Hu et al. ..................... | 375/341 |

OTHER PUBLICATIONS

Noh, H., "An Iterative MMSE-ML Detector for MIMO SC-FDMA System," Proceedings of the 2011 IEEE 54th International Midwest Symposium on Circuits and Systems, Aug. 7-10, 2011, 4 pages.
Banawan, K. A., et al., "Enhanced SIC and Initial Guess ML Receivers for Collaborative MIMO of the LTE Uplink," Copyright 2011, IEEE, 5 pages.

(Continued)

*Primary Examiner* — Sophia Vlahos

(57) ABSTRACT

A method and system are described for applying MLD detection to SC-FDMA data streams. Embodiments obtain initial estimates of at least some symbols encoded within an SC-FDMA data input using a non-MLD algorithm, and then use the initial estimates to reduce the search space and the MLD complexity. In addition, the reduced complexity MLD ("RC-MLD") is applied only to a limited search window within the digital communication input, thereby modeling only a subset of the symbols included in the digital communication input. The MLD complexity is thereby reduced sufficiently for an RC-MLD decoder to simultaneously model and extract a plurality of the symbols included in the data input. Symbols initially decoded by the non-MLD algorithm can be subtracted from the data input in a serial interference cancelling module. This cancellation can be applied successively in a turbo-loop.

45 Claims, 13 Drawing Sheets

(56) References Cited

OTHER PUBLICATIONS

Ketonen, J., et al., "MIMO Detection in Single Carrier Systems," 16th European Signal Processing Conference (EUSIPCO 2011), Barcelona, Spain, Aug. 29-Sep. 2, 2011, pp. 654-658.

Gerstacker, W.H., et al., "Trellis-Based Receivers for SC_FDMA Transmission Over MIMO ISI Channels," Proceedings of the IEEE International Conference on Communications, 2008, May 19-23, 2008, pp. 4526-4531.

* cited by examiner

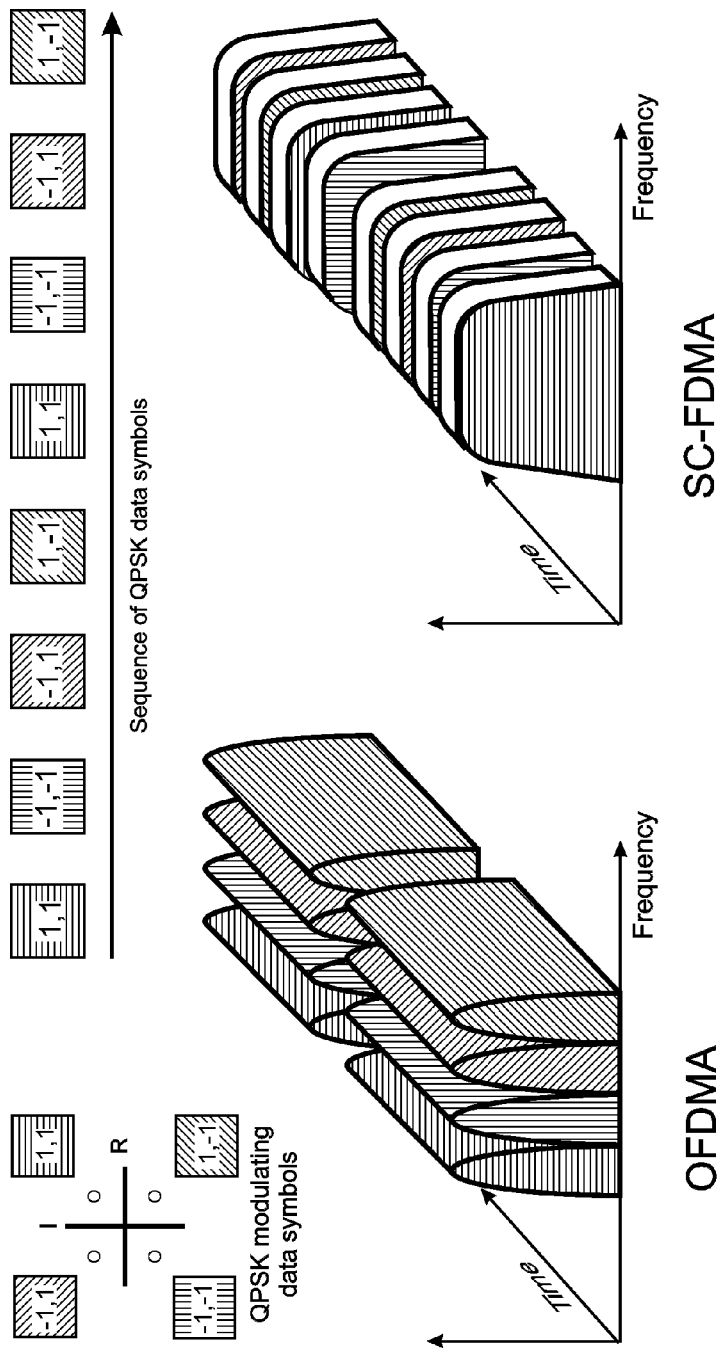

METHODS AND APPARATUS FOR EXTRACTING SYMBOLS FROM AN SC-FDMA DIGITAL COMMUNICATIONS SIGNAL USING A MAXIMUM LIKELIHOOD DETECTOR

FIELD

This subject matter disclosed relates to telecommunications, and more particularly, to methods of extracting symbols from a digital telecommunication signal.

BACKGROUND

A variety of detection algorithms are currently in use for extracting symbols from a digital telecommunication input. In general, the communication input that is to be analyzed may comprise one or more digital communication signals, each of which may include one or more data streams transmitted by one or more user devices. Each of the user devices may include one or more transmitters, and may transmit one or more data streams using one or more antennas.

For example, the digital communication input may include SU-MIMO (Single User-Multiple Input Multiple Output) data streams, where one user simultaneously sends multiple data streams using multiple transmit antennas that are received by multiple receive antennas. The data input may also include MU-MIMO (Multi User-Multiple Input Multiple Output) data streams, where multiple users simultaneously send multiple data streams using multiple transmit antennas that are received by multiple receive antennas. MUD (Multi-User Detection) is sometimes used as a generalized term, for modeling of multiple simultaneous data streams by the receiver, regardless of the number of users, transmit antennas, or receive antennas. In addition, the data streams may be transmitted using any of a number of transmission strategies, such as CDMA (Code Division Multiple Access), OFDM (Orthogonal Frequency Division Multiplexing), OFDMA (Orthogonal Frequency Division Multiple Access) and SC-FDMA (Single Carrier-Frequency Division Multiple Access).

For these transmission strategies, a maximum likelihood detector ("MLD") detection algorithm provides the best performance in recognizing and extracting symbols from the digital communication input. This makes MLD a desirable choice for receiver detection algorithms. Any of several forms of MLD can be applied, depending on the detection requirements. For example, a Maximum Likelihood Sequence Detector ("MLSD") can provide received data with the lowest average probability of bit errors, while a Maximum A-Posteriori Sequence Detector ("MAPSD") can be used to minimize the individual probability of bit errors.

A simplified example of MLD is illustrated by the flow diagram of FIG. 1A. In this simplified example, an OFDMA data stream is received 100, and a Fourier transform 102 is applied. The symbols are then extracted by MLD 106, as is well understood in the art.

The fundamental strategy of MLD detection is to search over all possible combinations of transmit waveform sequences in order to find the combination that matches the received waveform most closely. Therefore it can be viewed as an exhaustive search over all combinations of how a received waveform could have been generated. The exhaustive search of the MLD detection algorithm often requires a significant amount of computing resources and/or time in order to perform the required calculations, because the number of required calculations can grow exponentially based on changes to various conditions. Therefore, many communication receivers use reduced complexity versions of the MLD, such as the sphere decoder or M-Algorithm, or lower performance, non-MLD based approaches such as linear techniques or successive interference cancellation.

SC-FDMA data streams (used for example in LTE uplinks) are especially challenging to process with MLD. In SC-FDMA, a series of symbols are spread in frequency by a Fast Fourier Transform ("FFT") before being returned to the time domain by an inverse FFT ("iFFT"), where the iFFT size may be larger than the FFT size. The FFT spread causes the effect of a single symbol to be distributed over the entire time period that is associated with the iFFT. This typically provides a lower peak power to average power ratio, and allows user device transmitters to function more efficiently and allows use of transmitters having lower maximum power ratings.

A simplified example of SC-FDMA detection is illustrated by the flow diagram of FIG. 1B. In this simplified example, an SC-FDMA data stream is received 100, and a Fourier transform 102 is applied. A preprocessor 104 performs equalization and/or other operations on the transformed data, and then an inverse Fourier transform is applied 108. Finally, the symbols are extracted, typically by a simple demodulator since the signal has already been properly equalized by the preprocessor 104.

FIGS. 2A through 2D compare the OFDMA and SC-FDMA transmission strategies in terms of the distribution of the symbols in time and frequency during transmission. FIG. 2A illustrates QPSK modulating of the data symbols. FIG. 2B illustrates a sequence of transmitted QPSK symbols. FIG. 2C illustrates the symbols of FIG. 2B as they are distributed in time and frequency during transmission by OFDMA. Because a single inverse Fourier transform is applied before transmission, the symbols are concentrated in frequency and therefore extended in time. FIG. 2D illustrates the symbols of FIG. 2B as they are distributed in time and frequency during transmission by SC-FDMA. Because both a Fourier transform and an inverse Fourier transform are applied to the symbols before they are transmitted, the symbols are spread primarily in frequency, and are relatively concentrated in time, even though the energy from a single symbol does span the entire iFFT time window.

Due to the spreading of the symbols across all time, it is essentially impossible to process an SC-FDMA data stream using a full MLD algorithm. This is because the MLD search space would have to include all combinations of all possible symbols. As an example, for a 20 MHz LTE uplink including four 64-QAM data streams, an MLD algorithm would be required to perform 64^(4*1200) or 4.6×108669 operations. This is clearly infeasible, because the MLD detector would be required to perform this number of calculation every 66 microseconds, but in fact the most powerful supercomputer would not be able to perform this number of operations even if it started at the beginning of the known universe. Even a traditional, reduced complexity MLD, such as the sphere decoder or M-Algorithm, could not reduce the MLD complexity enough to make it a feasible detection method for SC-FDMA. Accordingly, extracting of symbols from multiple simultaneous SC-FDMA data streams has been limited to non-MLD detection algorithms, as illustrated in FIG. 1B.

What is needed, therefore, is a method and system for applying MLD detection to SC-FDMA data streams.

SUMMARY

Accordingly, a method and a system are described for applying MLD detection to SC-FDMA data streams.

Embodiments obtain initial estimates of at least some of the symbols encoded within an SC-FDMA data input using a non-MLD algorithm, and then use the initial estimates to reduce the search space and thereby reduce the MLD complexity. In addition, the reduced complexity MLD is applied only to a limited search window within the digital communication input, thereby modeling only a subset of the symbols included in the digital communication input. This is possible because the symbols are concentrated in time (see FIG. 2D). The MLD complexity is thereby reduced sufficiently for simultaneous modeling and extracting of a plurality of the symbols included in the data input. Symbols initially decoded by the non-MLD algorithm can be subtracted from the data input in an interference cancelling module. This cancellation can be applied successively in a turbo-loop.

According to an exemplary embodiment, a method is described that includes applying a Fourier transform to a received digital communication input comprising at least one digital communication signal that includes M data streams transmitted by N single carrier frequency division multiple access ("SC-FDMA") transmitters, where M and N are integers and are not necessarily equal to each other, said N transmitters being included in at least one user device, applying a pre-processing equalization algorithm to the digital communication input after the Fourier transform, applying an inverse Fourier transform to the digital communication input after applying the pre-processing algorithm, determining from the digital communication input after the inverse Fourier transform an initial estimate of at least one symbol included in the digital communication input, and using a reduced-complexity maximum likelihood detection ("RC-MLD") algorithm to simultaneously model and extract a plurality of symbols included in the digital communication input, where the RC-MLD algorithm is reduced in complexity by incorporating the initial estimate, and by applying the RC-MLD only to a search window that is limited in time within the digital communication input, thereby modeling only a subset of the symbols included in the digital communication input.

According to another exemplary embodiment, a radio receiver system is described that includes a Fourier transform component configured to apply a Fourier transform to a received digital communication input comprising at least one digital communication signal that includes M data streams from a N single carrier frequency division multiple access ("SC-FDMA") transmitters, where M and N are integers and are not necessarily equal to each other, and where the N transmitters are included in at least one user device, a pre-processing component configured to apply a pre-processing equalization algorithm to the digital communication input after the Fourier transform, an inverse Fourier transform component configured to apply an inverse Fourier transform to the digital communication input after the pre-processing, an estimating component configured to determine from the inverse transformed digital communication input after the inverse Fourier transform an initial estimate of at least one symbol included in the digital communication input, and a maximum likelihood detection component configured to receive the initial estimate and to simultaneously model and extract a plurality of symbols included in the digital communication input using a reduced-complexity maximum likelihood detection ("RC-MLD") algorithm, where the RC-MLD algorithm is reduced in complexity by incorporating the initial estimate, and by applying the RC-MLD only to a search window that is limited in time within the digital communication input, thereby modeling only a subset of the symbols included in the digital communication input.

According to yet another exemplary embodiment, non-transitory computer readable medium is described that is configured to store a computer program, executable by a machine for operating a radio receiver, the computer program including executable instructions for applying a Fourier transform to a received digital communication input comprising at least one digital communication signal that includes M data streams transmitted by N single carrier frequency division multiple access ("SC-FDMA") transmitters, where M and N are integers and are not necessarily equal to each other, and where the N transmitters being included in at least one user device, applying a pre-processing equalization algorithm to the digital communication input after the Fourier transform, applying an inverse Fourier transform to the digital communication input after the pre-processing, determining from the digital communication input after the inverse Fourier transform an initial estimate of at least one symbol included in the digital communication input, and using a reduced-complexity maximum likelihood detection ("RC-MLD") algorithm to simultaneously model and extract a plurality of symbols included in the digital communication input, where the RC-MLD algorithm is reduced in complexity by incorporating the initial estimate, and by applying the RC-MLD only to a search window that is limited in time within the digital communication input, thereby modeling only a subset of the symbols included in the digital communication input.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

The accompanying drawings provide visual representations which will be used to more fully describe the representative embodiments disclosed here and can be used by those skilled in the art to better understand them and their inherent advantages. In these drawings, like reference numerals identify corresponding elements, and:

FIG. 2A is a prior art phase diagram illustrating QPSK modulating data symbols;

FIG. 2B is a simplified prior art diagram illustrating a sequence of QPSK data symbols to be transmitted;

FIG. 2C is a prior art three-dimensional chart illustrating distribution of OFDMA signals in time and frequency space;

FIG. 2D is a three-dimensional chart illustrating the amplitude of SC-FDMA signals as distributed in time and frequency;

DETAILED DESCRIPTION

A method and system are described for applying MLD detection to an SC-FDMA data input. The MLD calculation is made feasible by using a preprocessing algorithm to make a priori estimates of some of the symbols included in the data input, which allows for a dramatic reduction in MLD complexity. In addition, the search window is limited in time. This is possible because, although the symbols are spread out over the time associated with the full iFFT, the energy from one particular symbol is well concentrated in time. This is illustrated in FIG. 2D. The window selection takes into account the amount of energy from each symbol and the length of the channel to capture the majority of the energy from the symbol and from the other symbols that may affect it.

The MLD complexity can be further reduced by limiting the bandwidth of each individual data stream. This is effective because a lower bandwidth signal has symbols that are longer in time. Since the symbols are longer in time, the channel spans fewer symbols.

Figure 1A:
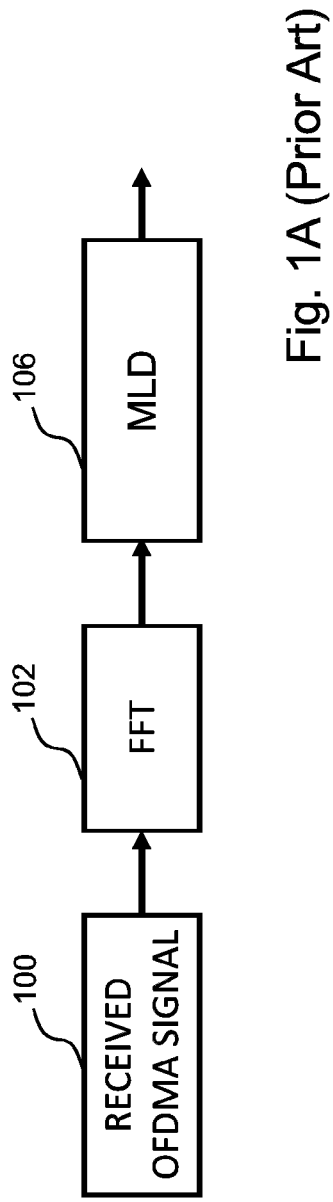
FIG. 1A is a prior art flow diagram illustrating detection and decoding of symbols included in a received OFDMA signal.
Figure 1B:
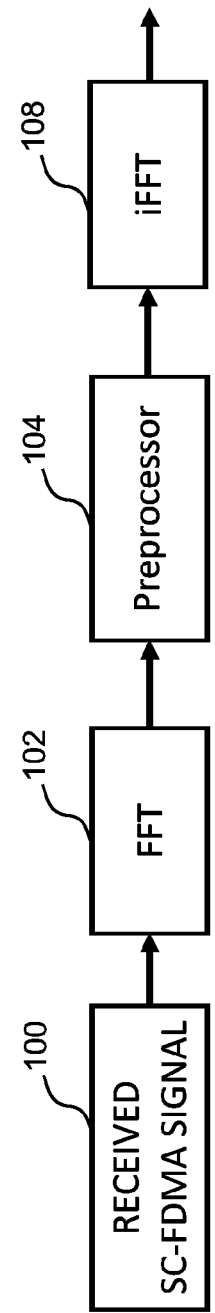
FIG. 1B is a prior art flow diagram illustrating detection and decoding of symbols included in a received SC-FDMA signal.
Figure 3A:
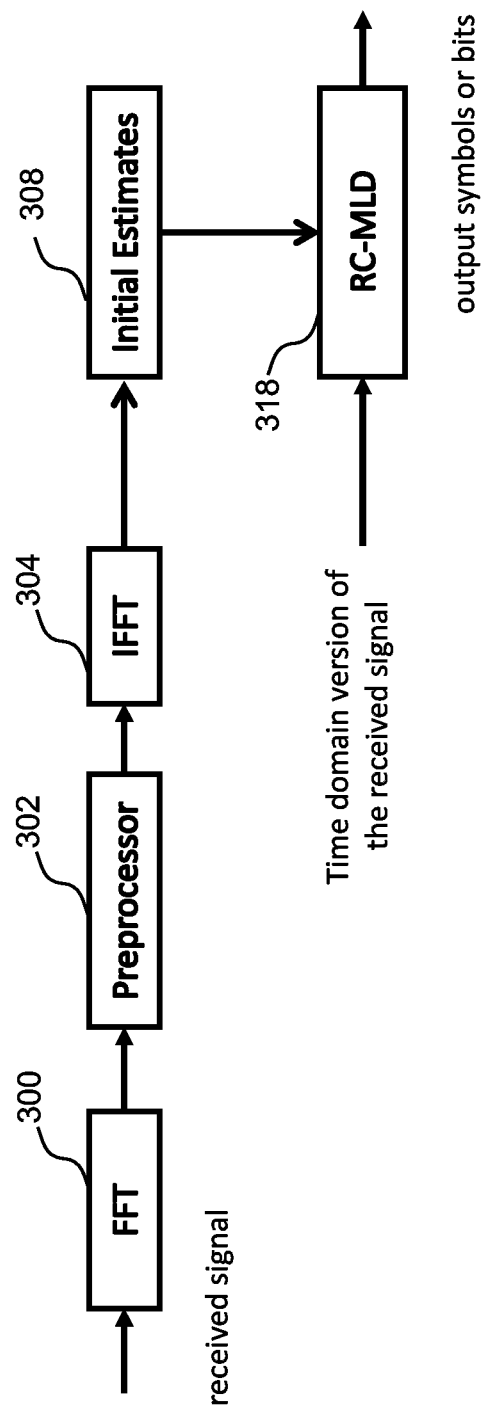
FIG. 3A is a flow diagram illustrating a method embodiment for extracting symbols from an SC-FDMA signal using RC-MLD detection.

Accordingly, the MLD complexity is reduced to an extent that enables a reduced complexity MLD ("RC-MLD") decoder to extract a plurality of symbols from the digital communication input. The RC-MLD decoder can be used to process many types of data input. The most common are SU-MIMO (Single User Multiple Input Multiple Output), where one user simultaneously sends multiple data streams out of multiple transmit antennas that are received by multiple receive antennas; MU-MIMO (Multi User Multiple Input Multiple Output), where multiple users simultaneously send multiple data streams out of multiple transmit antennas which are received by multiple receive antennas, and MUD (Multiple User Detection), where multiple simultaneous data streams are modeled inside the receiver. With reference to FIG. 3A, method embodiments include dividing the received signal into two parallel paths, one of which is an initial estimate path and the other is the RC-MLD path. In various embodiments, the received signal can include a plurality of data streams transmitted by a single user device and received by a plurality of receive antennas, a plurality of data streams transmitted by a plurality of user devices and received by a plurality of receive antennas, and/or a plurality of data streams transmitted by a plurality of user devices and received by a single antenna.

In the initial estimate path, a Fast Fourier Transform ("FFT") is applied to the received signal 300, followed by a pre-processing equalization algorithm 302, which in embodiments is based on a linear algebra technique that includes a minimum mean square error algorithm, a least squares algorithm, a decorrelator, a zero-forcing algorithm, a matched filter algorithm, and/or an interference rejection combining algorithm.

An inverse FFT ("iFFT") 304 is then applied, after which an initial estimate 308 of at least one of the symbols included in the received signal is generated. The initial estimate is then provided to a Reduced Complexity MLD ("RC-MLD") algorithm 318.

In the RC-MLD path, the symbols included in a time-domain version of the received signal are modeled and extracted using the RC-MLD algorithm 318. The RC-MLD 318 is reduced in complexity by incorporating the initial estimate or estimates 308, and by applying the RC-MLD only to a search window that is limited in time within the received signal, thereby modeling only a subset of the included symbols. The initial estimates may be hard or soft estimates or a combination of the two, where soft estimates include some form of confidence factors, while hard estimates make an actual decision on a symbol or bit. The RC-MLD algorithm 318 can include a full maximum likelihood detection algorithm, a sphere decoding algorithm (typically applied to a tree-based search), an M-algorithm, a Viterbi algorithm, a BCJR algorithm, a Maximum A-Posteriori Sequence Detector, a Maximum A-Posteriori Detector, a maximum likelihood sequence estimation algorithm, a T-algorithm (typically applied to a trellis-based search), and/or any other type of maximum likelihood search algorithm.

Figure 3B:
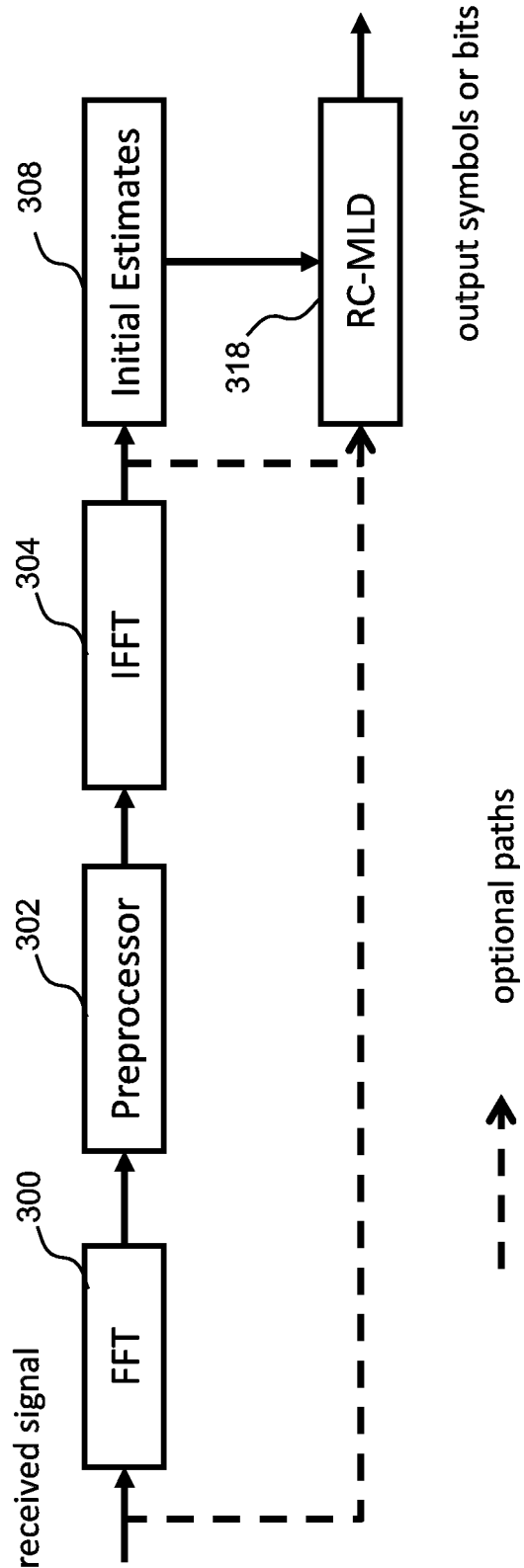
FIG. 3B is a flow diagram illustrating a method embodiment in which the received signal is used directly by the RC-MLD detection algorithm.
Figure 3C:
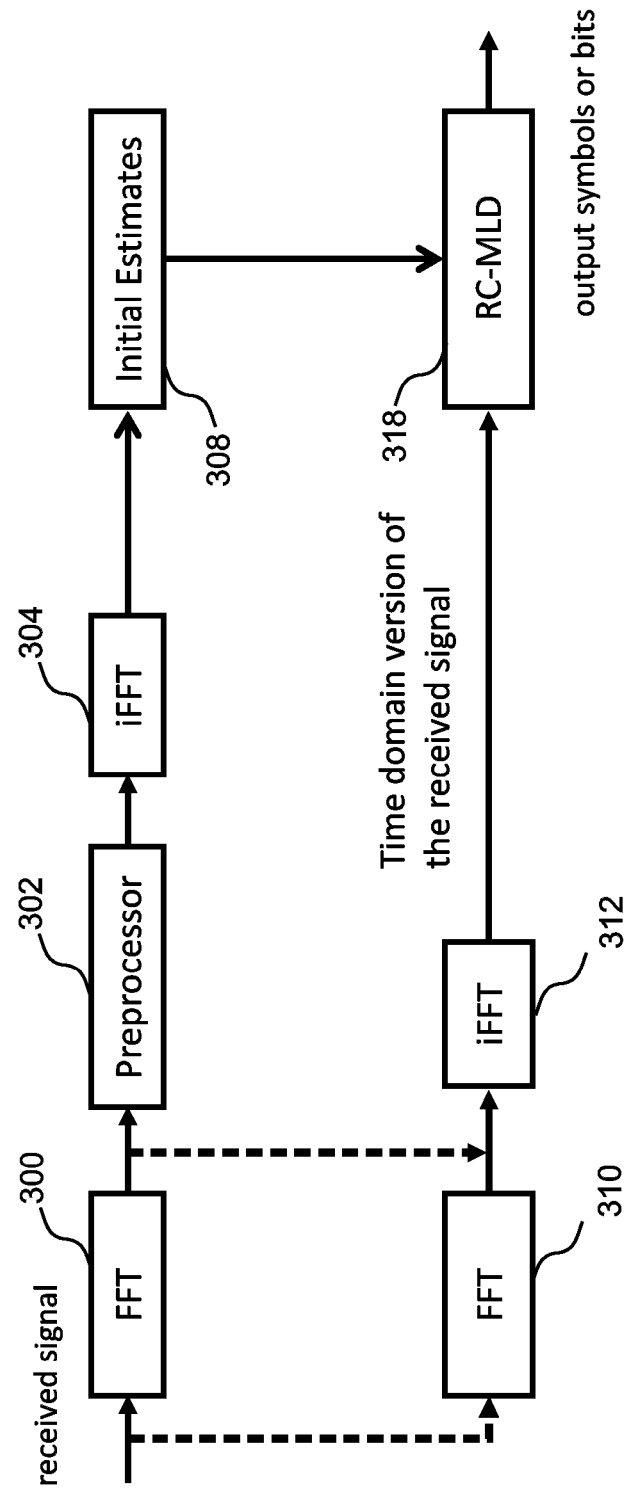
FIG. 3C is a flow diagram illustrating a method embodiment in which a Fourier transform and then an inverse Fourier transform is applied to the received signal before it is used by the RC-MLD detector.

As illustrated in FIG. 3B, the time-domain version of the received signal provided to the RC-MLD 318 in some embodiments can be the signal as it is originally received, or in other embodiments it can be the signal that results after applying the FFT 300, pre-processing 302, and iFFT 304. In other embodiments, as illustrated in FIG. 3C, the time-domain version of the received signal used in the RC-MLD path can be the result of applying an FFT 310 to the received signal, followed by an iFFT 312, but without applying pre-processing 302 to the signal. In various embodiments, the result of applying the FFT 300 in the initial estimate path can be used instead of or in addition to the FFT 310.

Figure 3D:
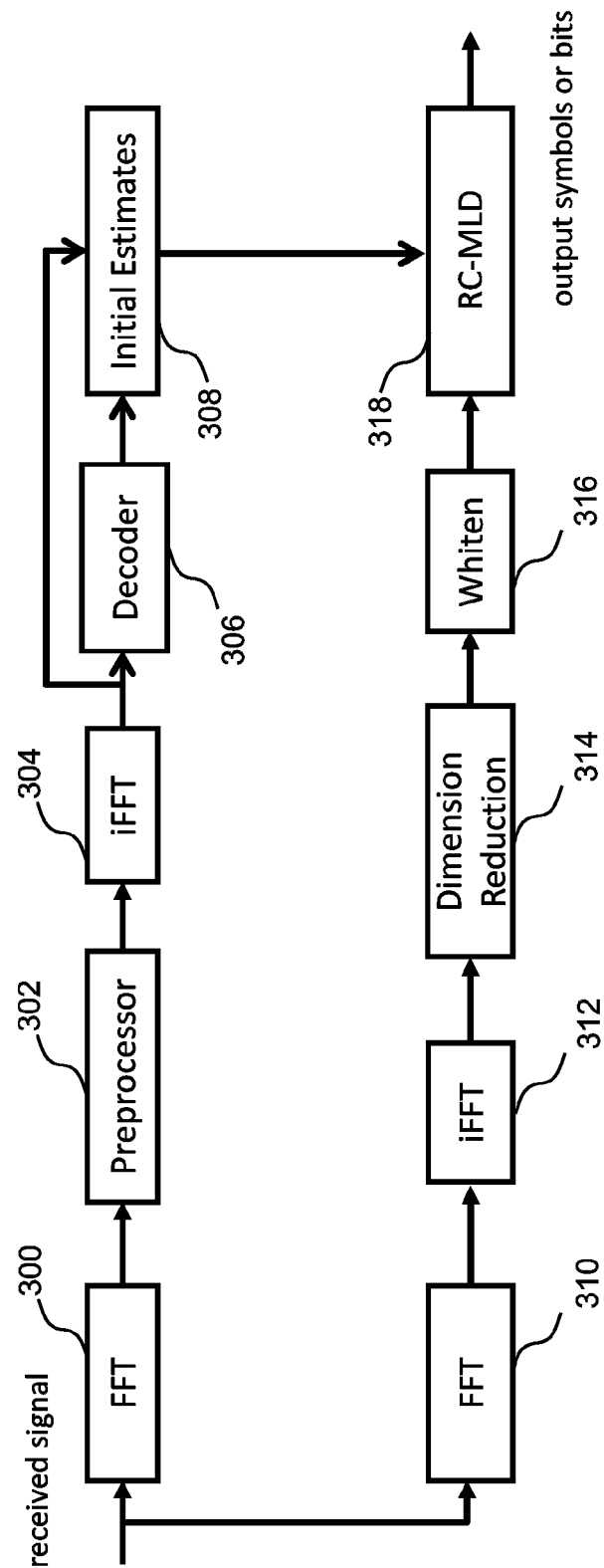
FIG. 3D is a flow diagram illustrating a method embodiment in which spatial dimension reduction and noise whitening is applied to the received signal before it is used by the RC-MLD detector.

With reference to FIG. 3D, in still other embodiments the FFT 310 is applied in the RC-MLD path to the time-domain received signal, followed by the iFFT 312. In the embodiment of FIG. 3D, after the iFFT 312, the dimensions of the signal are reduced 314. In some of these embodiments, the dimension reduction method uses a matched filter, a de-correlator, a Minimum Mean Square Error ("MMSE") algorithm, or an interference rejection combining algorithm. In various embodiments, a whitening filter 316 is applied to the data after the dimension reduction step 314. Note that, while FIG. 3D illustrates two different FFT's 300, 310, in some embodiments there is only one FFT 300, the output of which is then split into the initial estimate and RC-MLD paths, as described above with reference to FIG. 3C above.

In various embodiments, the complexity of the RC-MLD detection is further reduced by a complexity reduction strategy that includes at least one of the following: applying the method at least sometimes to reduced bandwidth signals; reducing a constellation search space; reducing a size of the time window; limiting a number of states to a maximum; and removing states below a specified confidence level. In some of these embodiments, reducing the constellation search space includes at least one of the following: defining a maximum number of constellation points per symbol; searching for a constellation point if its likelihood is above a specified minimum; and limiting a constellation point search to a most likely symbol. In certain of these embodiments, reducing a size of the time window includes at least one of: limiting the size of the time window to a specified maximum; and reducing the size of the time window until a number of operations required for the RC-MLD is less than a specified maximum. And in various of these embodiments, the complexity reduction strategy is dynamically adjusted, as frequently as for each data packet.

In embodiments, the method further includes reducing a number of dimensions 314 of the transformed digital communication input after applying the iFFT 312. And in some of these embodiments, reducing the number of dimensions 314 includes at least one of applying a matched filter algorithm, applying a decorrelation algorithm, applying a minimum mean square error algorithm, and/or applying an interference rejection combining algorithm.

Figure 4:
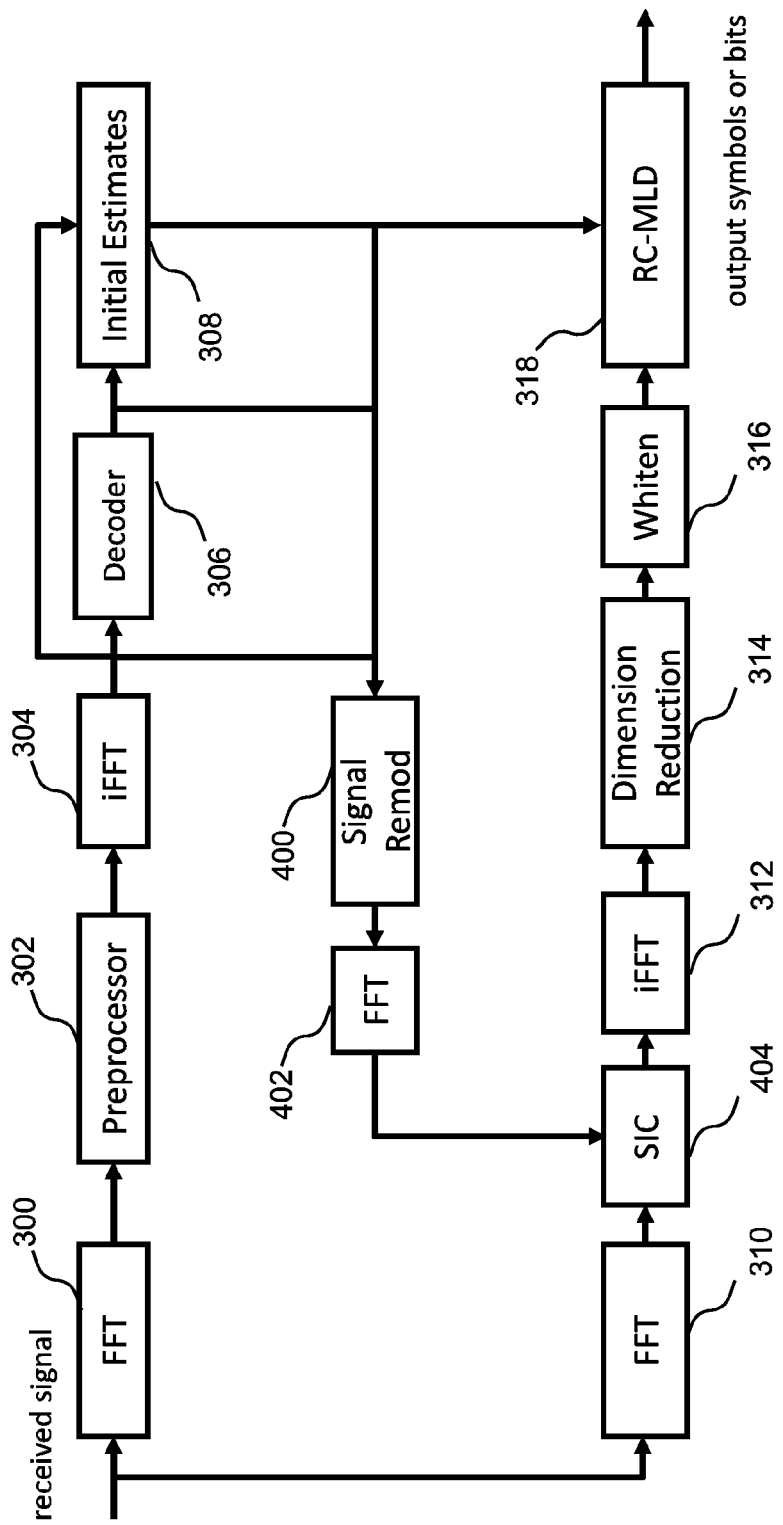
FIG. 4 is a flow diagram illustrating a method embodiment similar to FIG. 3, but including successive interference cancellation implemented to reduce the number of symbols and/or data streams to be modeled by the RC-MLD.

With reference to FIG. 4, in various embodiments the symbol estimates 308 are remodulated 400 and a Fourier transform is applied 402, after which Successive Interference Cancellation ("SIC") 404 may be applied to the transformed signal input to the RC-MLD path followed by applying the iFFT 312, dimension reduction 314, whitening filter 316, and RC-MLD detection 318, so that fewer signals are modeled in the RC-MLD 318. The SIC attempts to suppress of the energy from one or more data streams to minimize the interference in the received signal. Here, parallel interference reduction can occur since, since in the initial estimate path the pre-processing equalization algorithm 302, in embodiments, applies an interference rejection combining algorithm.

Figure 5A:
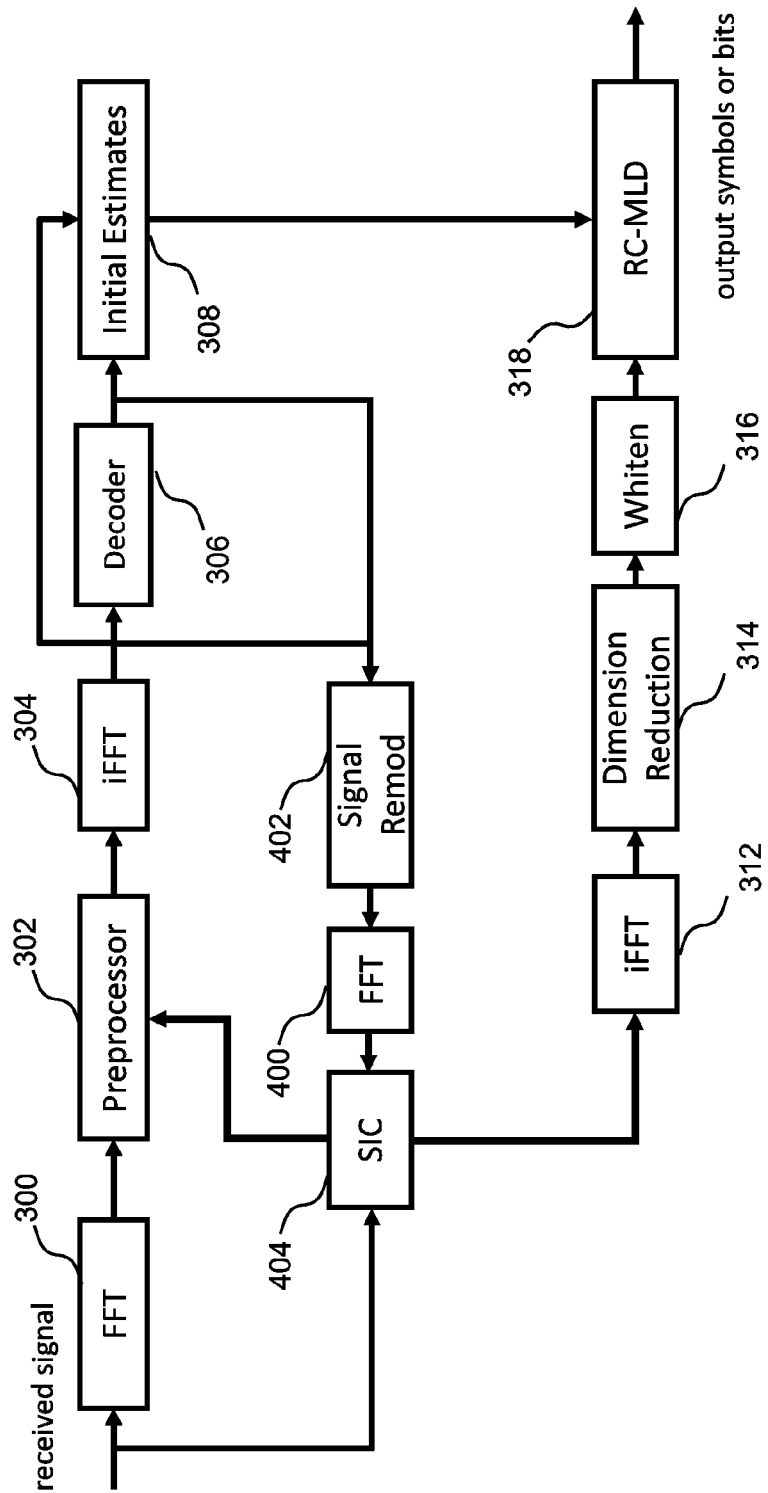
FIG. 5A is a flow diagram illustrating a method embodiment similar to FIG. 4, but including application of successive interference cancellation applied in a turbo loop to the estimated signal.
Figure 5B:
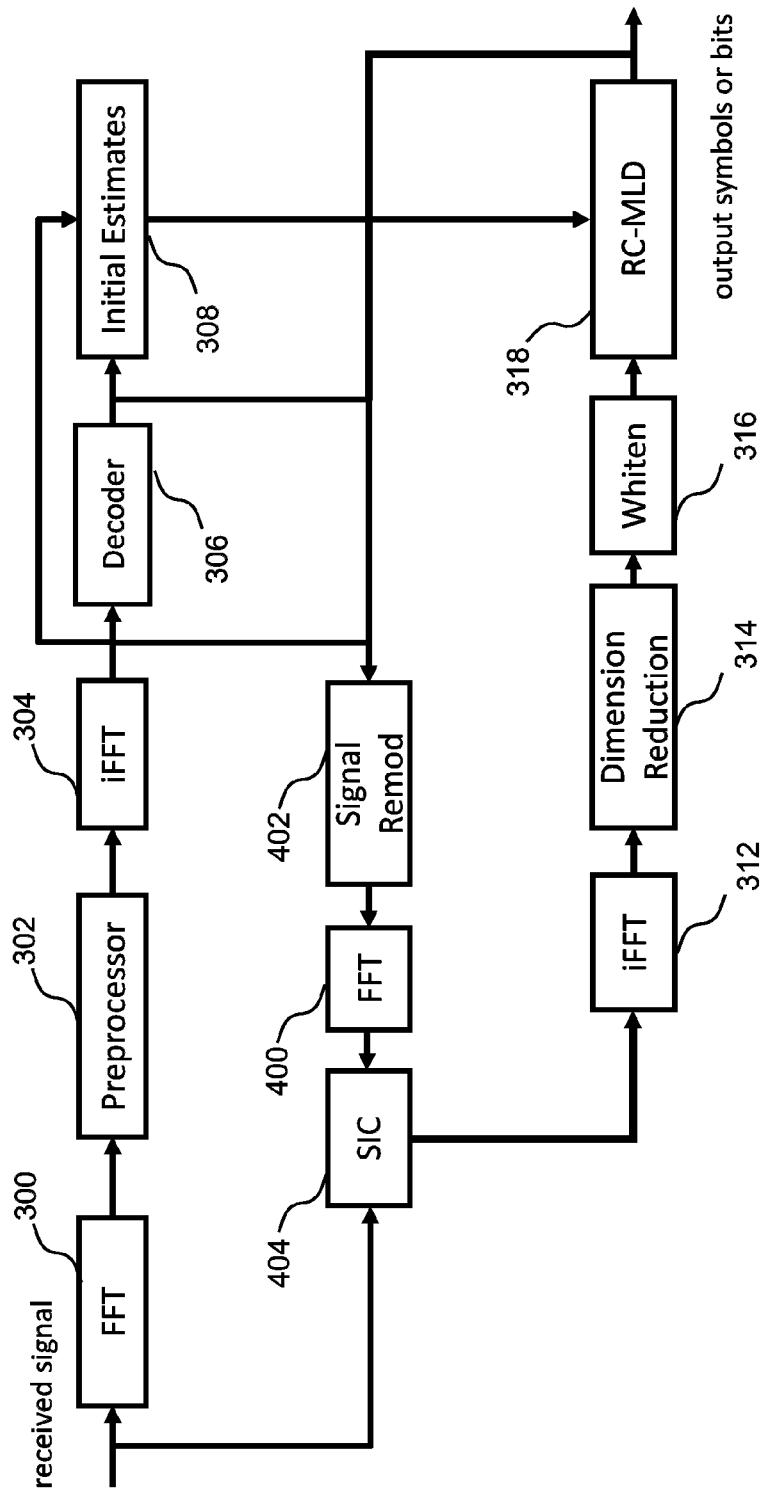
FIG. 5B is a flow diagram illustrating a method embodiment similar to FIG. 4, but including successive interference cancellation applied in a turbo-loop to the signal detected by the RC-MLD.

With reference to FIGS. 5A and 5B, the successive interference cancellation can be repeated in a turbo-loop. FIG. 5A illustrates an embodiment that includes multiple turbo loops of the preprocessor 302 and SIC 404 before the final SIC 404 and RC-MLD 318. The figure includes only one SIC component, but in embodiments the SIC algorithm that is applied in the RC-MLD path may not be identical to the SIC algorithm that is applied in the preprocessor turbo loops.

FIG. 5B illustrates an embodiment in which the successive interference cancellation can be applied in a turbo loop in the RC-MLD path. Note that various embodiments successively apply the SIC loops of FIG. 5A and FIG. 5B.

As is discussed in more detail below with reference to FIGS. 7A-7C, in certain embodiments a logic engine 724 is used to determine which of the data streams is/are to be modeled within the RC-MLD 714. In some of these embodiments the logic engine 724 determines which of the data streams are to be modeled by determining that all of the data streams are to be modeled. In other embodiments, the logic engine 724 determines that all of the data streams that are undecoded are to be modeled, or that a subset of the data streams are to be modeled, where the subset includes no more than a fixed maximum number of data streams. And in some of these embodiments, the subset of data streams is selected according to one of the following: which data streams have the highest received power; which data streams have the highest signal-to-noise ratio; which data streams have the highest signal to interference plus noise ratio; which data streams have the highest signal-to-interference ratio; which data streams have the lowest bit error rate; which data streams have the lowest packet error rate; which data streams have the lowest block error rate; and an outage capacity metric.

Figure 6:
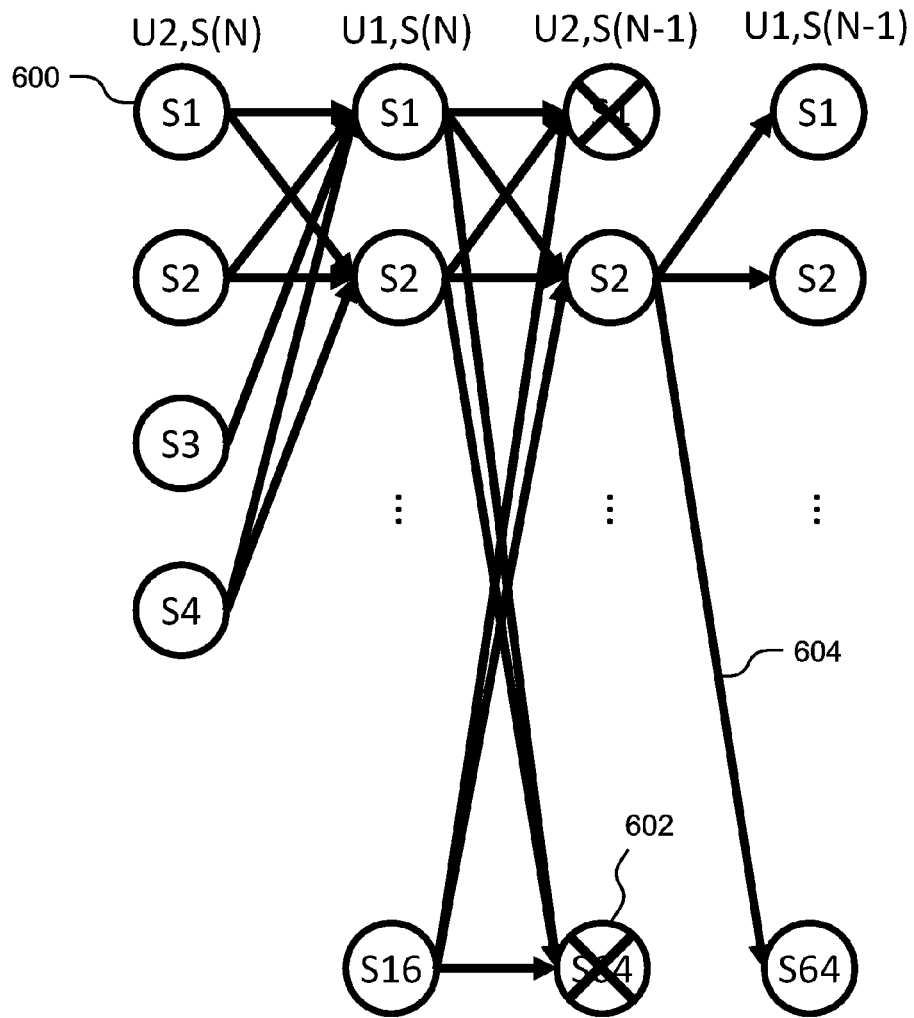
FIG. 6 is a flow diagram illustrating an embodiment in which a trellis transition is included in the RC-MLD algorithm from the end to the start per symbol.

With reference to FIG. 6, in some embodiments a trellis transition in the RC-MLD 318 occurs from the end to the start per symbol. FIG. 6 shows the operation of a Viterbi algorithm in a case to process data streams from two users, where the first two symbols are shown as. U1,S1 (standard notation for user 1, symbol 1) and U2,S1. This example assumes that each user is transmitting a single QPSK data stream. The process starts by defining four states, S1 (600) to S4 representing the four possible QPSK symbols. Each state is effectively the probability of that sequence occurring or some similar measurement that relates to the confidence of the sequence being correct. Since the U2,S 1 is one of four possible QPSK symbols, it now expands to 16 states, where each state represents one of the four possible QPSK symbols from U1,S1 and one of the four possible QPSK symbols from U2,S1. Since the time window is above one symbol, at U1,S2, we expand four more states to 64 states. The X's superimposed on some of the states 602 illustrate the application of a complexity reduction technique that limits the maximum number of states. In embodiments, the number of states is reduced down to a specified number of states by only keeping the most likely paths. This process continues until the full time window length or a specified sliding window length is met. For sliding window based implementations in some embodiments, the last symbol of the sliding window is chosen each time by performing a trace forward operation. In other implementations that are not sliding window based, however, only one trace forward operation is required to obtain the symbols. In some embodiments where a trellis transition in the RC-MLD occurs, the RC-MLD algorithm 318 includes performing a backward recursion through the trellis of states 600 during which at least one state is discarded 602, and performing a forward recursion 604 through only those states that were not discarded during the backward recursion. In some of these embodiments, soft values of the channel bits using this backward-forward recursion are straightforwardly obtained by computing the marginal probabilities of the channel bits from the reduced set of states. And in various embodiments, the RC-MLD algorithm 318 includes a tail-biting operation.

Figure 7A:
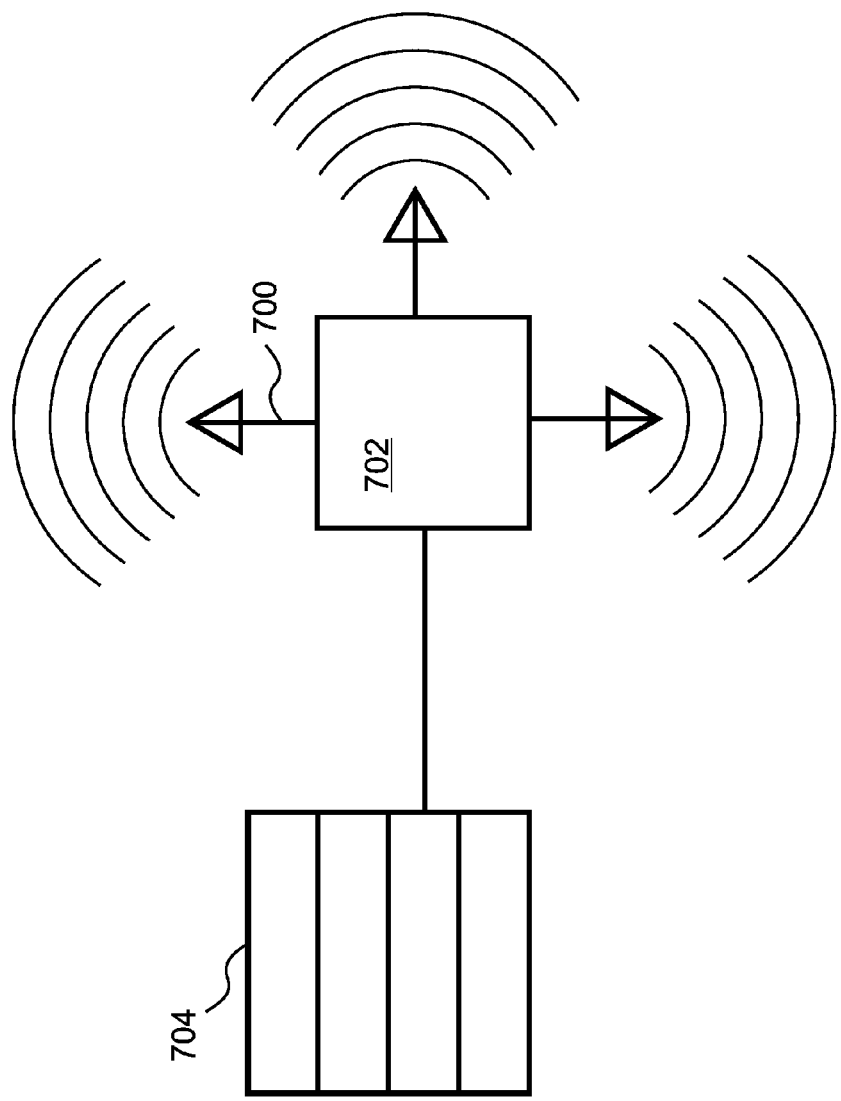
FIG. 7A is a simplified diagram illustrating the components of a radio receiver system embodiment.

FIG. 7A illustrates a radio receiver system embodiment in which the radio receiver includes at least one antenna 700, and a signal receiving unit 702 configured to receive a digital communication input from the at least one antenna 700 comprising at least one digital communication signal that includes M data streams from a N single carrier frequency division multiple access ("SC-FDMA") transmitters, where M and N are integers and are not necessarily equal to each other, said N transmitters being included in at least one user device. In addition, the radio receiver includes a signal processing unit 704.

Figure 7B:
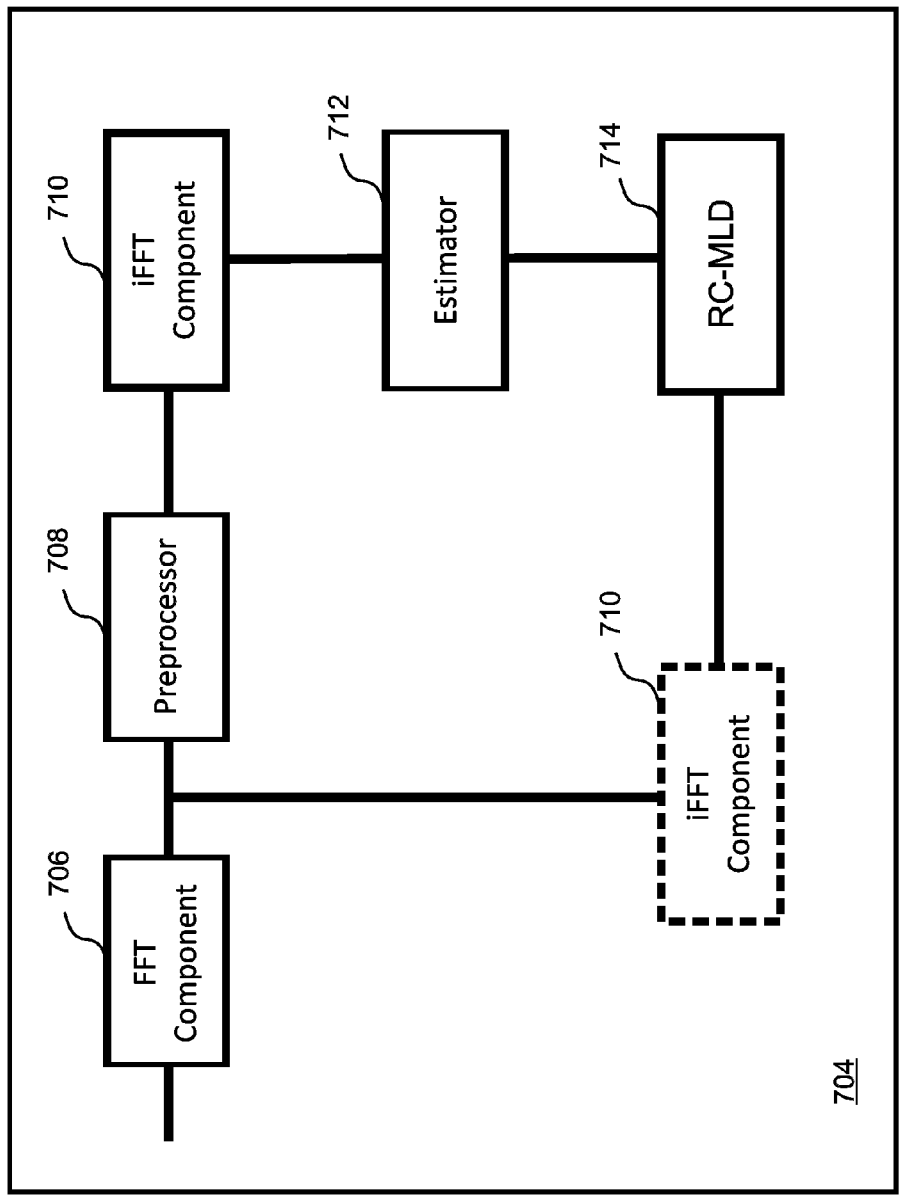
FIG. 7B is a simplified diagram illustrating the components included in the signal receiving unit of a radio receiver system embodiment.

With reference to FIG. 7B, in embodiments the signal processing unit 704 include an FFT component 706 configured to apply a Fourier transform to the received digital communication input. The radio receiver further includes an equalizing preprocessor 708 configured to apply a pre-processing equalization algorithm to the digital communication input after the Fourier transform, and an inverse Fourier transform component 710 configured to apply an inverse Fourier transform to the digital communication input after the pre-processing. The system also includes an estimator 712 configured to determine from the inverse transformed digital communication input after the inverse Fourier transform an initial estimate of at least one symbol included in the digital communication input.

The signal processing unit 704 of FIG. 7B further includes a maximum likelihood detector 714 configured to receive the initial estimate and to simultaneously model and extract a plurality of symbols included in the digital communication input using a reduced-complexity maximum likelihood detection ("RC-MLD") algorithm, where the RC-MLD algorithm is reduced in complexity by incorporating the initial estimate, and by applying the RC-MLD only to a limited search window within the digital communication input, thereby modeling only a subset of the symbols included in the digital communication input.

Some embodiments of the radio receiver further include a decoder 716 configured to apply a decoding algorithm to the digital communication input after the inverse transformation of the digital communication input and before determination of the initial estimate of at least one symbol, and/or a whitener 718 configured to applying a whitening filter to the transformed digital communication input after the inverse Fourier transformation component has performed the inverse Fourier transform on the digital communication input.

Various embodiments of the radio receiver further include a dimension reducer 720 configured to reduce the number of dimensions of the digital communication input after the inverse Fourier transformation component has performed the inverse Fourier transform on the digital communication input.

Figure 7C:
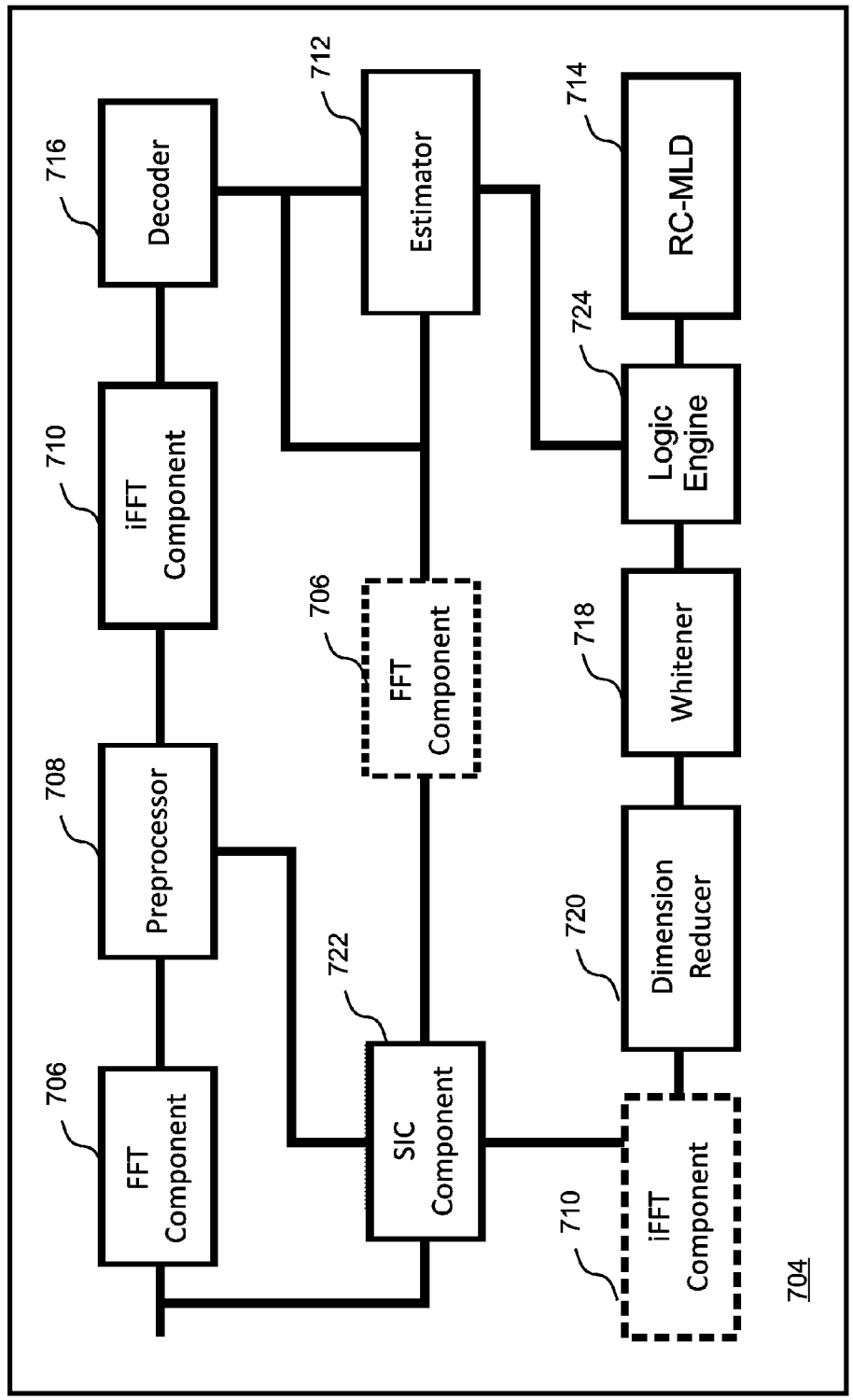
FIG. 7C is a simplified diagram similar to FIG. 7B, but including additional components.

With reference to FIG. 7C, some embodiments include a successive interference cancellation ("SIC") component 722 configured to reduce the interference of the digital communication input after the inverse Fourier transformation component has performed the inverse Fourier transform on the digital communication input. Other embodiments include a logic engine 724 configured to determine which of the data streams are to be modeled within the RC-MLD.

The radio receiver illustrated in FIG. 7A is an instruction execution machine, apparatus, or device and may comprise one or more of a microprocessor, a digital signal processor, a graphics processing unit, an application specific integrated circuit (ASIC), a field programmable gate array (FPGA), and the like. The radio receiver may be configured to execute program instructions stored in a memory and/or data storage (both not shown). The memory may include read only memory (ROM) and random access memory (RAM). The data storage may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data.

It is noted that the methods described herein can be embodied in executable instructions stored in a computer-readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

The radio receiver is preferably incorporated into a base station ("BS") that operates in a networked environment using logical connections to one or more remote nodes (not shown). The remote node may be another BS, a user equipment ("UE"), a computer, a server, a router, a peer device or other common network node. The base station may interface with a wireless network and/or a wired network. For example, wireless communications networks can include, but are not limited to, Code Division Multiple Access (CDMA), Time Division Multiple Access (TDMA), Frequency Division Multiple Access (FDMA), Orthogonal Frequency Division Multiple Access (OFDMA), and Single-Carrier Frequency Division Multiple Access (SC-FDMA). A CDMA network may implement a radio technology such as Universal Terrestrial Radio Access (UTRA), Telecommunications Industry Association's (TIA's) CDMA2000®, and the like. The UTRA technology includes Wideband CDMA (WCDMA), and other variants of CDMA. The CDMA2000® technology includes the IS-2000, IS-95, and IS-856 standards from The Electronics Industry Alliance (EIA), and TIA. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advance (LTE-A) are newer releases of the UMTS that use E-UTRA. UTRA, E-UTRA, UMTS, LTE, LTE-A, and GAM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. Other examples of wireless networks include, for example, a BLUETOOTH network, a wireless personal area network, and a wireless 802.11 local area network (LAN).

Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. It should be understood that the arrangement of components illustrated in FIGS. 7A through 7C is but one possible implementation and that other arrangements are possible. It should also be understood that the various system components (and means) defined by the claims, described below, and illustrated in the various block diagrams represent logical components that are configured to perform the functionality described herein. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIGS. 7A through 7C. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

To facilitate an understanding of the subject matter described, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. One of ordinary skill in the art should appreciate after learning the teachings related to the claimed subject matter contained in the foregoing description that variations of those preferred embodiments may become apparent to those of ordinary skill in the art upon reading the foregoing description. The inventor intends that the claimed subject matter may be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

I claim:

1. A method of extracting a plurality of symbols from a digital communication input, the method comprising:
   by a system for a radio receiver:
   applying a Fourier transform to a received digital communication input comprising at least one digital communication signal that includes M data streams of symbols transmitted by N single carrier frequency division multiple access ("SC-FDMA") transmitters, where M and N are integers and are not necessarily equal to each other, said N transmitters being included in at least one user device;
   applying a pre-processing equalization algorithm to the digital communication input after the Fourier transform;
   applying an inverse Fourier transform to the digital communication input after applying the pre-processing algorithm;
   determining from the digital communication input after the inverse Fourier transform an initial estimate of at least one symbol included in the digital communication input; and
   using a reduced-complexity maximum likelihood detection ("RC-MLD") algorithm to simultaneously model and extract a plurality of the symbols included in the digital communication input, where the RC-MLD algorithm is reduced in complexity by incorporating the initial estimate, and by applying the RC-MLD only to a search window that is limited in time within the digital communication input, thereby modeling only a subset of the symbols included in the digital communication input.

2. The method of claim 1, wherein the plurality of symbols extracted by the RC-MLD algorithm are used in a turbo loop to perform successive interference cancellations on the transformed digital communication input before application of the inverse Fourier Transformation and RC-MLD.

3. The method of claim 1, wherein the pre-processing algorithm is based on a linear algebra technique that includes at least one of:
   a minimum mean square error algorithm;
   a least squares algorithm;
   a decorrelation algorithm;
   a zero-forcing algorithm;

a matched filter algorithm; and an interference rejection combining algorithm.

4. The method of claim 1, wherein the digital communication input comprises at least one of:

a plurality of data streams of symbols transmitted by a single user device and received by a plurality of receive antennas;

a plurality of data streams of symbols transmitted by a plurality of user devices and received by a plurality of receive antennas; and a plurality of data streams of symbols transmitted by a plurality of user devices and received by a single antenna.

5. The method of claim 1, wherein the RC-MLD algorithm includes at least one of:

a full maximum likelihood detection algorithm;

a sphere decoding algorithm;

an M-algorithm;

a Viterbi algorithm;

a BCJR algorithm;

a Maximum A-Posteriori Sequence Detector;

a Maximum A-Posteriori Detector;

a maximum likelihood sequence estimation algorithm; and a T-algorithm.

6. The method of claim 1, further comprising applying a decoding algorithm after the inverse transformation of the digital communication input and before determining the initial estimate of at least one symbol.

7. The method of claim 6, further comprising including soft or extrinsic information provided by the decoding algorithm and associated with the initial estimate in the RC-MLD algorithm.

8. The method of claim 1, wherein the complexity of the RC-MLD is further reduced by a complexity reduction strategy that includes at least one of:

applying the method at least sometimes to reduced bandwidth signals;

reducing a constellation search space;

reducing a size of a time window;

limiting a number of states to a maximum; and removing states below a specified confidence level.

9. The method of claim 8, wherein reducing the constellation search space includes at least one of:

defining a maximum number of constellation points per symbol;

searching for a constellation point if its likelihood is above a specified minimum; and limiting a constellation point search to a most likely symbol.

10. The method of claim 8, wherein reducing a size of a time window includes at least one of:

limiting the size of the time window to a specified maximum; and reducing the size of the time window until a number of operations required for the RC-MLD is less than a specified maximum.

11. The method of claim 8, wherein the complexity reduction strategy is dynamically adjusted.

12. The method of claim 1, further comprising reducing a number of dimensions of the transformed digital communication input after applying the inverse Fourier Transformation.

13. The method of claim 12, wherein reducing the number of dimensions includes at least one of:

applying a matched filter algorithm;

applying a decorrelation algorithm;

applying an minimum mean square error algorithm; and applying an interference rejection combining algorithm.

14. The method of claim 1, further comprising applying a whitening filter to the transformed digital communication input after applying the inverse Fourier Transformation.

15. The method of claim 1, further comprising applying successive interference cancellation or parallel interference cancellation after applying the Fourier transformation and before applying the inverse Fourier transformation and RC-MLD.

16. The method of claim 15, wherein application of the successive interference cancellation or parallel interference cancellation is repeated in a turbo loop.

17. The method of claim 1, wherein a logic engine is used to determine which of the M data streams of symbols are to be modeled within the RC-MLD.

18. The method of claim 17, wherein the logic engine determines which of the M data streams of symbols are to be modeled by at least one of:

determining that all of the M data streams of symbols are to be modeled;

determining that all of the M data streams of symbols that are undecoded are to be modeled;

determining that a subset of the M data streams of symbols are to be modeled, where the subset includes no more than a fixed maximum number of data streams of symbols.

19. The method of claim 18, wherein the subset of data streams of symbols is selected according to one of:

which data streams of symbols have the highest received power;

which data streams of symbols have the highest signal-to-noise ratio;

which data streams of symbols have the highest signal to interference plus noise ratio;

which data streams of symbols have the highest signal-to-interference ratio;

which data streams of symbols have the lowest bit error rate;

which data streams of symbols have the lowest packet error rate;

which data streams of symbols have the lowest block error rate; and an outage capacity metric.

20. The method of claim 1, wherein a trellis transition in the RC-MLD occurs between an end of one symbol and a start of another.

21. The method of claim 1, wherein the RC-MLD algorithm includes:

performing a backward recursion through a trellis of states during which at least one state is discarded; and performing a forward recursion through only those states that were not discarded during the backward recursion.

22. The method of claim 1, wherein the RC-MLD algorithm includes a tail-biting operation.

23. A system for a radio receiver, the system comprising:

a signal receiving unit configured to receive a digital communication input comprising at least one digital communication signal that includes M data streams of symbols from a N single carrier frequency division multiple access ("SC-FDMA") transmitters, where M and N are integers and are not necessarily equal to each other, said N transmitters being included in at least one user device; and a signal processing unit, where the signal processing unit includes:

a Fourier transform component configured to apply a Fourier transform to the received digital communication input;

a pre-processing component configured to apply a pre-processing equalization algorithm to the digital communication input after the Fourier transform;

an inverse Fourier transform component configured to apply an inverse Fourier transform to the digital communication input after the pre-processing;

an estimating component configured to determine from the inverse transformed digital communication input after the inverse Fourier transform an initial estimate of at least one symbol included in the digital communication input; and a maximum likelihood detection component configured to receive the initial estimate and to simultaneously model and extract a plurality of the symbols included in the digital communication input using a reduced-complexity maximum likelihood detection ("RC-MLD") algorithm, where the RC-MLD algorithm is reduced in complexity by incorporating the initial estimate, and by applying the RC-MLD only to a search window that is limited in time within the digital communication input, thereby modeling only a subset of the symbols included in the digital communication input.

24. The system of claim 23, wherein the pre-processing component is configured to use the plurality of symbols extracted by the RC-MLD algorithm in a turbo loop to perform successive interference cancellations on the transformed digital communication input before application of the inverse Fourier transformation and RC-MLD.

25. The system of claim 23, wherein the pre-processing algorithm is based on a linear algebra technique that includes at least one of:

a minimum mean square error algorithm;
a least squares algorithm;
a decorrelation algorithm;
a zero-forcing algorithm;
a matched filter algorithm; and
an interference rejection combining algorithm.

26. The system of claim 23, wherein the digital communication input includes at least one of:

a plurality of data streams of symbols transmitted by a single user device and received by a plurality of receive antennas;

a plurality of data streams of symbols transmitted by a plurality of user devices and received by a plurality of receive antennas; and a plurality of data streams of symbols transmitted by a plurality of user devices and received by a single antenna.

27. The system of claim 23, wherein the RC-MLD algorithm includes at least one of:

a full maximum likelihood detection algorithm;
a sphere decoding algorithm;
an M-algorithm;
a Viterbi algorithm;
a BCJR algorithm;
a Maximum A-Posteriori Sequence Detector;
a Maximum A-Posteriori Detector;
a maximum likelihood sequence estimation algorithm; and
a T-algorithm.

28. The system of claim 23, further comprising a decoding component configured to apply a decoding algorithm to the digital communication input after the inverse transformation of the digital communication input and before the determination of the initial estimate of at least one symbol.

29. The system of claim 28, wherein the maximum likelihood detection component is configured to include soft information provided by the decoding component and associated with the initial estimate in the RC-MLD algorithm.

30. The system of claim 23, wherein maximum likelihood detection component is configured to further reduce the complexity of the RC-MLD by applying a complexity reduction strategy that includes at least one of:

applying the method at least sometimes to reduced bandwidth signals;
reducing a constellation search space;
reducing a size of a time window;
limiting a number of states to a maximum; and
removing states below a specified confidence level.

31. The system of claim 30, wherein reducing the constellation search space includes at least one of:

defining a maximum number of constellation points per symbol;
searching for a constellation point if its likelihood is above a specified minimum; and
limiting a constellation point search to a most likely symbol.

32. The system of claim 30, wherein reducing a size of a time window includes at least one of:

limiting the size of the time window to a specified maximum; and
reducing the size of the time window until a number of operations required for the RC-MLD is less than a specified maximum.

33. The system of claim 30, wherein the maximum likelihood detector component is configured to dynamically adjust the complexity reduction strategy.

34. The system of claim 23, further comprising a dimension reduction component configured to reduce a number of dimensions of the digital communication input after the inverse Fourier transformation component has performed the inverse Fourier transform on the digital communication input.

35. The system of claim 34, wherein the dimension reduction component is configured to reduce the number of dimensions by at least one of:

applying a matched filter algorithm;
applying a decorrelation algorithm;
applying an minimum mean square error algorithm; and
applying an interference rejection combining algorithm.

36. The system of claim 23, further comprising a whitening component configured to applying a whitening filter to the transformed digital communication input after the inverse Fourier transformation component has performed the inverse Fourier transform on the digital communication input.

37. The system of claim 23, further comprising a successive interference cancellation component configured to apply successive interference cancellation or parallel interference cancellation to the digital communication input after the Fourier transformation component has applied the Fourier transformation and before the inverse Fourier transformation component has applied the inverse Fourier transformation.

38. The system of claim 37, wherein the successive interference cancellation component is configured to repeat the successive interference cancellation or parallel interference cancellation in a turbo loop.

39. The system of claim 23, further comprising a logic engine configured to determine which of the M data streams of symbols are to be modeled within the RC-MLD.

40. The system of claim 39, wherein the logic engine is configured to determine which of the M data streams of symbols are to be modeled by at least one of:

determining that all of the M data streams of symbols are to be modeled;

determining that all of the M data streams of symbols that are undecoded are to be modeled;
determining that a subset of the M data streams of symbols are to be modeled, where the subset includes no more than a fixed maximum number of data streams of symbols.

41. The system of claim 40, wherein the logic engine is configured to select the subset of data streams of symbols according to one of:
which data streams of symbols have the highest received power;
which data streams of symbols have the highest signal-to-noise ratio;
which data streams of symbols have the highest signal to interference plus noise ratio;
which data streams of symbols have the highest signal-to-interference ratio;
which data streams of symbols have the lowest bit error rate;
which data streams of symbols have the lowest packet error rate;
which data streams of symbols have the lowest block error rate; and
an outage capacity metric.

42. The system of claim 23, wherein a trellis transition in the RC-MLD occurs between an end of one symbol and a start of another symbol.

43. The system of claim 23, wherein the maximum likelihood detector component is configured to:
perform a backward recursion through a trellis of states during which at least one state is discarded; and
perform a forward recursion through only those states that were not discarded during the backward recursion.

44. The system of claim 23, wherein the maximum likelihood detector component is configured to perform a tail-biting operation.

45. A non-transitory computer readable medium storing a computer program, executable by a machine, for operating a radio receiver, the computer program comprising executable instructions which when executed by the machine cause the machine to perform the steps of:
applying a Fourier transform to a received digital communication input comprising at least one digital communication signal that includes M data streams of symbols transmitted by N single carrier frequency division multiple access ("SC-FDMA") transmitters, where M and N are integers and are not necessarily equal to each other, said N transmitters being included in at least one user device;
applying a pre-processing equalization algorithm to the digital communication input after the Fourier transform;
applying an inverse Fourier transform to the digital communication input after the pre-processing;
determining from the digital communication input after the inverse Fourier transform an initial estimate of at least one symbol included in the digital communication input; and
using a reduced-complexity maximum likelihood detection ("RC-MLD") algorithm to simultaneously model and extract a plurality of the symbols included in the digital communication input, where the RC-MLD algorithm is reduced in complexity by incorporating the initial estimate, and by applying the RC-MLD only to a search window that is limited in time within the digital communication input, thereby modeling only a subset of the symbols included in the digital communication input.

* * * * *